United States Patent [19]
Wang et al.

[11] Patent Number: 6,106,948
[45] Date of Patent: Aug. 22, 2000

[54] NONLINEAR OPTICAL STRUCTURE AND METHODS OF MAKING

[75] Inventors: Xiaogong Wang, Beijing, China; Srinivasan Balasubramanian, Lowell, Mass.; Lian Li, N. Chelmsford, Mass.; Sukant Tripathy, Acton, Mass.; Jayant Kumar, Westford, Mass.

[73] Assignee: University of Massachusetts, Boston, Mass.

[21] Appl. No.: 08/870,345

[22] Filed: Jun. 6, 1997

[51] Int. Cl.[7] .......................... B32B 27/38; B32B 27/00; B05D 5/06; B05D 1/36

[52] U.S. Cl. .......................... 428/413; 428/500; 427/162; 427/407.1

[58] Field of Search ..................................... 428/413, 500; 430/281.1, 286.1, 287.1; 427/162, 407.1

[56] References Cited

U.S. PATENT DOCUMENTS

| | | | |
|---|---|---|---|
| 5,112,881 | 5/1992 | Mandal et al. | 522/117 |
| 5,433,895 | 7/1995 | Jeng et al. | 252/582 |
| 5,464,932 | 11/1995 | Allcock et al. | 528/399 |
| 5,882,785 | 3/1999 | Hollins et al. | 428/333 |

OTHER PUBLICATIONS

Lvov et al., "Non–Linear Optical Effects in Layer–by–Layer Alternative Films of Polycations and an Azobenzene–Containing Polyanion," *Thin Solid Films* 300:107–112, May 1997.

Mortazavi et al., "Second–harmonic Generation and Absorption Studies of Polymer–dye Films Oriented by Cornona–onset Poling at Elevated Temperatures," *J.Opt.Soc.Am.B.*, Apr. 1989.

Advincula et al., "In Situ Investigations of Polymer Self–Assembly Solution Adsorption by Surface Plasmon Spectroscopy", *Langmuir*, 12:3536–3540 (1996).

Ashwell et al., "Non–centrosymmetry and second–harmonic generation in Z–type Langmuir–Blodgett films", *Nature*, 368:438–440 (1994).

Chen et al., "Layer–by–Layer Deposition: A Tool for Polymer Surface Modification", *Macromolecules*, 30:78–86 (1997).

Cheung et al., "Molecules self–assembly of conducting polymers", *Thin Solid Films*, 244:985–989 (1994).

Decher et al., "Buildup of ultrathin multilayer films by a self–assembly process: III. Consecutively alternating adsorption of anionic and cationic . . . surfaces",*Thin Solid Films*, 210/211:831–835 (1992).

Decher et al., "Proof of multilayer structural organization in self–assembled polycation–polyanion molecular films", *Thin Solid Films*, 244:772–777 (1994).

Ferreira et al., "Molecular–Level Processing of Conjugated Polymers. 1. Layer–by–Layer Manipulation of Conjugated Polyions", *Macromolecules*, 28:7107–7114 (1995).

Fou et al., "Fabrication and properties of light–emitting diodes based on self–assembled multilayers of poly(phenylene vinylene)", *J. Appl. Phys.*, 79(10):7501–7509 (May 15, 1996).

(List continued on next page.)

*Primary Examiner*—Paul Thibodeau
*Assistant Examiner*—Holly C. Ridunan
*Attorney, Agent, or Firm*—Fish & Richardson P.C.

[57] ABSTRACT

A method for making a multilayer structure having macroscopic second order nonlinear optical properties is described. The resulting nonlinear optical structures made by the method are also described. The method includes the steps of contacting a substrate having ionic adsorption sites with a first charged polyion; ceasing contact of the substrate with the first charged polyion; and thereafter, contacting the substrate with a second charged polyion having a charge opposite to that of the first charged polyion, wherein at least one of the polyions includes a nonlinear optical chromophoric side chain.

23 Claims, 12 Drawing Sheets

OTHER PUBLICATIONS

Fou et al., "Molecular–Level Processing of Conjugated Polymers. 2. Layer–by–Layer Manipulating of In–Situ Polymerized p–Type Doped Conducting Polymers", *Macromolecules*, 28:7115–7120 (1995).

Hoogeveen et al., "Formation and Stability of Multilayers of Polyelectrolytes", *Langmuir*, 12:3675–3681 (1996).

Katz et al., "Chromophore Structure, Second Harmonic Generation, and Orientational Order in Zirconium Phosphonate/Phosphate Self–Assembled Multilayers", *J. Am. Chem. Soc.*, 116:6636–6640 (1994).

Li et al., "Chromophoric Self–Assembled Multilayers, Organic Superlattice Approaches to Thin–Films Nonlinear Optical Materials", *J. Am. Chem. Soc.*, 112:7389–7390 (1990).

Okawa et al., "Fabrication of an Ultrathin Film of a Conjugated Polymer and an NLO Dye", *Mol. Cryst. Lig. Cryst.*, 255:159–165 (1994).

Roscoe et al., "Self–Assembled Chromophoric NLO–Active Monolayers. X–ray Reflectivity and Second–Harmonic Generation as Complementary Probes of Building . . . Relationships", *Langmuir*, 12:4218–4223 (1996).

Roscoe et al., "Self–Assembled Chromophoric NLO–Active Structures. Second–Harmonic Generation and X–ray Photoelectron . . . Benzyl Halide–Functionalized Surfaces", *Langmuir*, 12:5338–5349 (1996).

Takahashi et al., "Langmuir–Blodgett films of polymers containing nonlinear optical molecules in the side chains", *Thin Solid Films*, 210/211:202–204 (1992).

Takahashi et al., "Langmuir–Blodgett Films of Polymethacrylates with Side Chains Containing Functionalized Aromatic Schiff's Bases", *Journal of Polymer Science*, 31:165–173 (1993).

Yitzchaik et al., "Chromophoric Self–Assembled NLO Multilayer Materials, Real Time Observation of Monolayer Growth and Microstructural Evolution by in Situ . . . Techniques", *J. Phys. Chem.*, 97:6958:6960 (1993).

NONLINEAR OPTICAL STRUCTURE AND METHODS OF MAKING

STATEMENT AS TO FEDERALLY SPONSORED RESEARCH

This invention was made with government support under N 0014-95-1-1292 awarded by ONR MURI. The government may have certain rights to the invention.

BACKGROUND OF THE INVENTION

This invention relates to methods of making nonlinear optical structures from suitable polymers, and the resulting structures.

Nonlinear optical (NLO) polymers attract a great deal of attention due to their potential applications in photonic technologies. NLO materials exhibit an induced polarization that is nonlinear with an incident electromagnetic (EM) field, even at modest incident EM intensities. For a material to exhibit even-order NLO effects, such as second harmonic generation (SHG), the material must be non-centrosymmetric. Therefore, macroscopic even-order NLO effects are present in NLO polymers only if their NLO chromophores are assembled in an acentric arrangement.

The conventional method for aligning chromophores in polymer thin films is to use an external strong electric field to pole the chromophores along a prescribed direction. See, for example, M. Mortazavi et al., *J. Opt. Soc. Am. B.,* 6:733 (1989). However, since the thin films are ultimately removed from the strong field, the chromophores exist in a thermodynamically unstable state and tend to randomize over time, thereby degrading the NLO properties over time.

Other methods involve processes in which the chromophores self-assemble into a noncentrosymmetric alignment, as opposed to forced assembly. One such method involves the formation of acentric Y-type Langmuir Blodgett (LB) films incorporating NLO chromophores. See, for example, G. J. Ashwell et al., *Nature,* 357:393 (1992). Another method involves the formation of oriented multi-layers using tailored chemisorption processes. See, for example, D. Li et al., *J. Am. Chem. Soc.,* 112:7389 (1990).

SUMMARY OF THE INVENTION

The invention is based on the unexpected result that side chain non-linear optical (NLO) chromophores will self-align into an ordered arrangement when adsorbed onto a substrate that is alternately contacted with oppositely charged polyelectrolyte solutions. The method produces ordered multilayer structures exhibiting macroscopic NLO properties.

In general, in one aspect, the invention features a method of making a multilayer structure having macroscopic second order nonlinear optical properties. The method includes the following steps: 1) contacting a substrate having ionic adsorption sites with a first charged polyion; 2) ceasing contact of the substrate with the first charged polyion; and 3) contacting the substrate with a second charged polyion having a charge opposite to that of the first charged polyion. At least one of the polyions includes a nonlinear optical chromophoric side chain.

Furthermore, the method can include any one of the following features. The substrate can be hydrophilic or charged. The side chain can be a rod-like mesogen and can include an azo group. One or both of the polyions can be formed from an epoxy-based polymer or a poly(acrylic acid) copolymer. In particular, one of the polyions can be ionized CH-1A-NS or ionized CH-1A-CA as described herein. The invention also features a multilayer structure produced by the above method.

In another aspect, the invention features a multilayer structure including a first layer that includes polymers of a first type and a second layer that includes polymers of a second type. Each polymer of the first type includes a nonlinear optical chromophoric side chain. These side chains are oriented to exhibit macroscopic even-order nonlinear optical properties.

The structure can include any one of the following features. The structure can have a $d_{33}$ value of greater than 0.1 pm/V or greater than 1.0 pm/V. The structure can also include a substrate, on which one of the layers is adsorbed. The side chains can be rod-like mesogens and can include an azo group. The first type of polymer can be formed from an epoxy-based polymer or a poly(acrylic acid) copolymer. In particular, the first type of polymer can be CH-1A-NS or CH-1A-CA.

An "NLO chromophoric side chain" is a side chain that includes functional groups or molecules that possess donor-acceptor groups, as described herein, which give rise to macroscopic second order nonlinear optical properties.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The method is simple and can be performed in a relatively short period of time (e.g., less than about 1 to 2 hours). Furthermore, the NLO structures produced are stable and remain ordered indefinitely. They also have NLO coefficients comparable to or better than those of structures made by other methods. The NLO structures produced by the invention will find wide-spread applications in photonics, e.g., as sensors, wavelength converters, non-linear logic gates, optical switches, and as components for integrated optics.

Other features and advantages of the invention will be apparent from the following detailed description, and from the claims.

DETAILED DESCRIPTION

The invention is based on results showing that non-linear optical (NLO) chromophoric side chains in polymer multilayer structures formed on a substrate by alternately dipping the substrate into an anionic polyelectrolyte and a cationic polyelectrolyte self-assemble into an ordered arrangement that exhibits macroscopic non-linear optical properties. The self-assembly of NLO chromophoric side chains within one or more of the alternating layers of polyanions and polycations formed on the substrate is highly useful. Because of the self-assembly, and unlike the case for randomly-oriented NLO chromophoric side chains, the macroscopic even-order NLO polarization induced by electromagnetic (EM) radiation propagating through the layers does not necessarily average to zero. Indeed, under proper phase-matching conditions, the multilayer structures can exhibit large NLO effects, such as second harmonic generation (SHG), which are useful in a number of photonic and integrated optic applications.

Though the invention requires that at least one of the polyions include a NLO chromophoric side chain, the multilayer deposition is otherwise quite general and will be described first.

Multilayer Deposition

The build-up of multilayer structures on a substrate is achieved by consecutive alternating physisorption of anionic and cationic polyelectrolytes. The ionic attraction between opposite charges is the driving force for the multilayer formation. In principle, all polyelectrolytes can be used for the adsorption, as long as at least one of the polyions includes a NLO chromophoric side chain.

The procedure has the following steps. First, a substrate is treated to provide adsorption sites for ionic electrolytes. Typically, the surface of a glass substrate is made hydrophilic by sonicating the substrate in a concentrated $H_2SO_4$/$H_2O_2$ (7:3) solution and then sonicating in a $H_2O$/$H_2O_2$/$NH_4OH$ (5:1:1) solution. Alternately, the substrates can be sonicated in Chem-solv Lab Cleaner, which is a highly alkaline solution commercially available from Mallinckrodt Baker Inc. (Paris, Ky.). The hydrophilic surface contains energetically favorable sites (e.g., dangling hydroxyl bonds) for the adsorption of ionic species in solution. Any substrate that can be made hydrophilic can be used. For example, the substrates can be made of the following materials: fused quartz, crystalline quartz, polycrystalline silicon, amorphous silicon, and borosilicate glasses. Substrates having a coating, such as indium tin oxide (ITO), can also be made hydrophilic and used in the invention.

In the second step, the hydrophilic substrate is immersed in a cationic polyelectrolyte solution. The ionic groups of the polycations then physisorb onto the hydrophilic substrate. The concentration of polycations is selected to be large enough that the polycations saturate the adsorption sites of the substrate, thereby covering the substrate and forming a polycation monolayer. Thereafter, the substrate is removed from solution and washed in deionized water to remove any unadsorbed polycations.

In the third step, the substrate is immersed in an anionic polyelectrolyte solution. The exposed surface of the polycation monolayer carries positive charges from the ionic groups of the polycation and provides adsorption sites for the polyanions. As with the polycations, the concentration of polyanions is selected to be large enough that the polyanions saturate the adsorption sites of the polycation monolayer, thereby forming a second layer, of polyanions.

The exposed surface of the multilayer structure now carries negative charge, i.e., adsorption sites for polycations. Therefore, after the substrate is removed from the anionic polyelectrolyte solution and washed in deionized water, the second and third steps can be repeated indefinitely. Once the desired number of layers are formed, the multilayer structure is cleaned in deionized water and stored. The multilayer structures are stable and require no special storage conditions.

In the above description, the substrate is first immersed in a cationic electrolyte, however, polyanions will also physisorb onto the hydrophilic substrate surface, so that the substrate can be first immersed in an anionic electrolyte, i.e., the order of steps 2 and 3 can be reversed. Also, even though the adsorption of polyions onto the hydrophilic or charged surface occurs rapidly, e.g., within about five minutes or less, the substrate can be left in solution for a relatively longer time (e.g., about 10 minutes) to insure the complete saturation of the substrate surface sites. The time can be optimized by following the adsorption of the polyion using UV-VIS spectroscopy to determine the surface saturation time.

The concentration range for the polyelectrolyte solution is typically about 0.1 mM (millimoles/liter) to 10 mM. The concentration is based on the repeat unit. For example, in poly(acrylic acid) the repeat unit is —$CH_2$—CH(COOH)— with a molecular weight of 72, so that 1 mM equals 0.072 g/L. Multilayer formation is typically performed under ambient conditions, i.e., at about room temperature and pressure.

Since the multilayer formation is based on the attraction of oppositely charged groups on the respective polyions, the process requires at least two oppositely charge molecules. Of course, the process is not limited to only two particular charged molecules. Indeed, as long as the multilayers are alternately formed by oppositely charged molecules, the particular choice of polycation or polyanion can be varied for each monolayer in the multilayer structure simply by immersing the substrate into the polyelectrolyte solutions in the order dictated by the desired multilayer sequence.

Figure 1A:
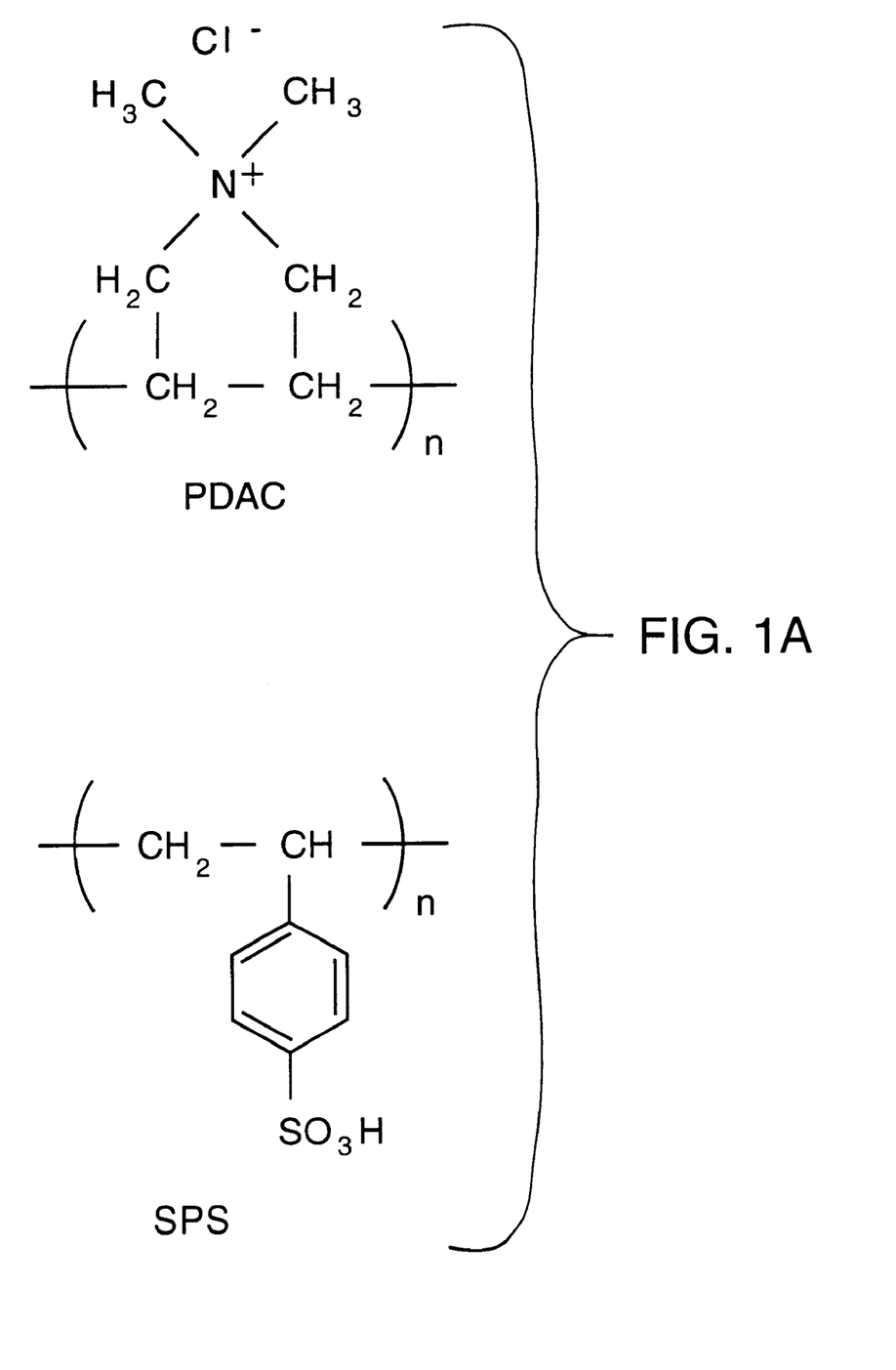
FIGS. 1A, 1B, 1C, and 1D are chemical structures of polyelectrolytes used in the invention.
Figure 1B:
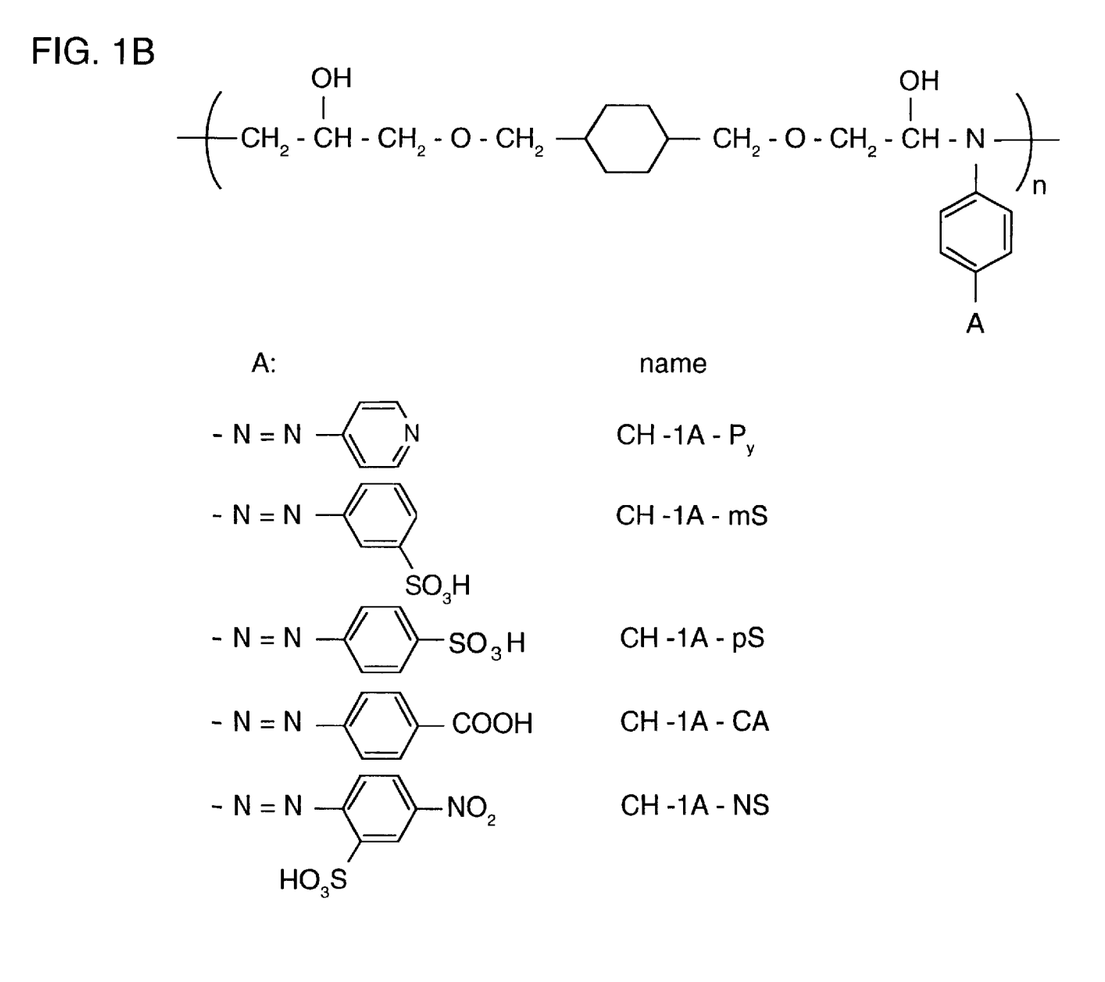
Figure 1C:
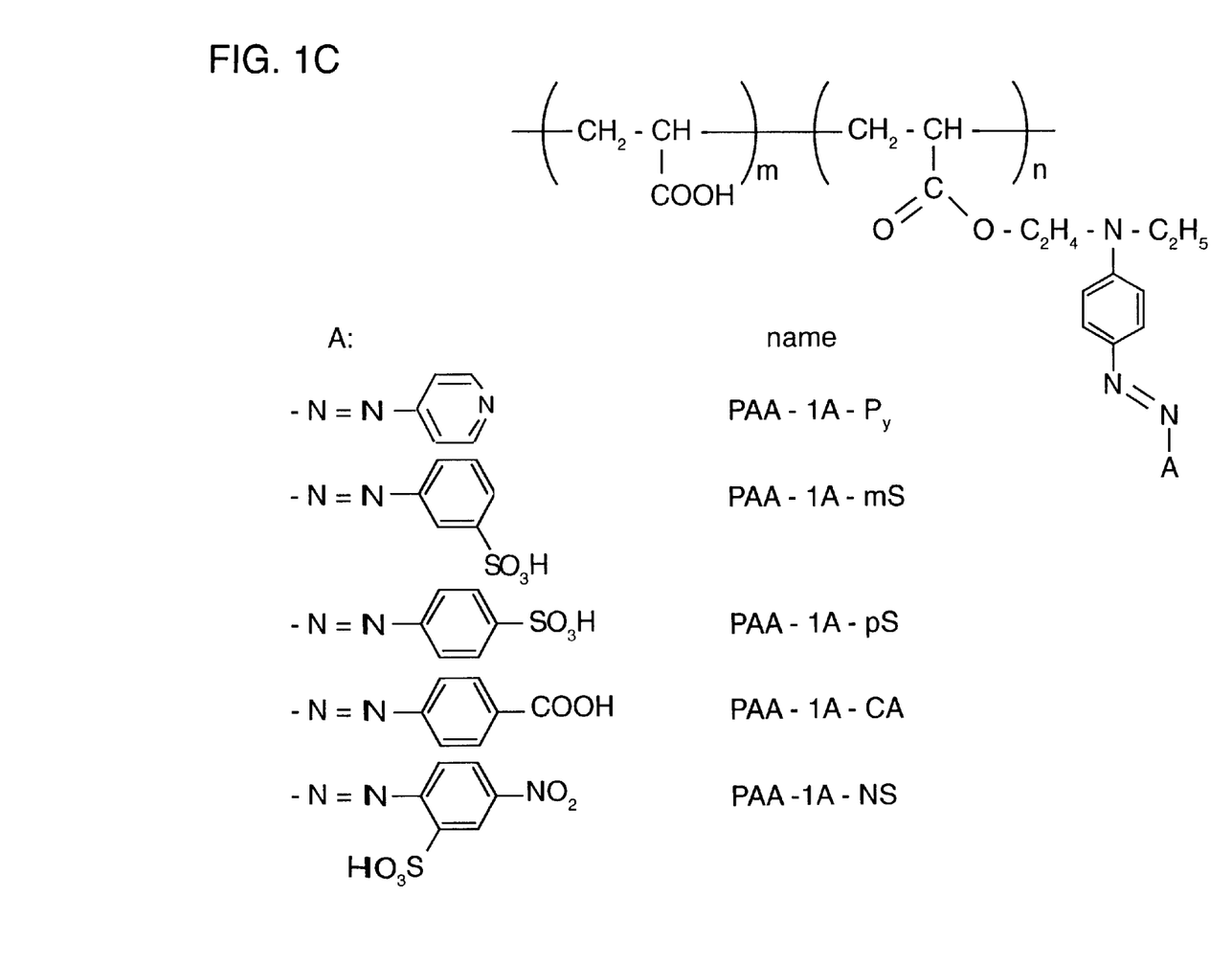
Figure 1D:
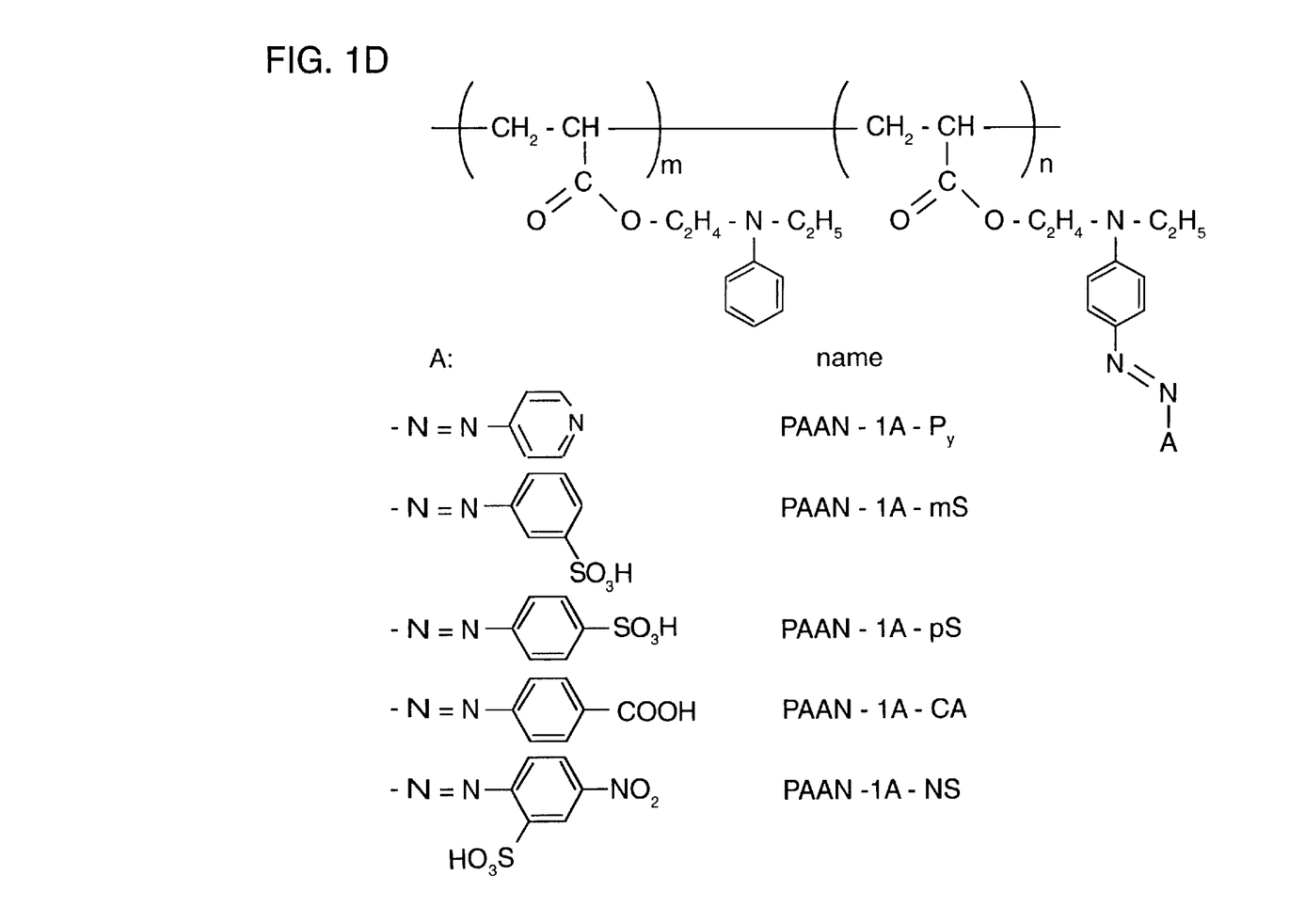

The ionizable groups of the polyelectrolytes can be on the backbone or side-chains. Typically, they are terminal functional groups including, for example, —COOH, —$SO_3H$, or pyridine. Specific examples of suitable polyelectrolytes include polycation precursor poly(diallyldimethylammonium chloride) (PDAC), polyanion precursor sulfonated polystyrene (SPS), shown in FIG. 1A, and epoxy-based polymers such as polycation precursor CH-1A-Py and polyanion precursors CH-1A-NS, CH-1A-mS, CH-1A-pS, and CH-1A-CA, as shown in FIG. 1B. Other examples of suitable polyelectrolytes include poly(acrylic acid) copolymers, such as polycation precursors PAA-1A-Py and PAAN-1A-Py, and polyanion precursors PAA-1A-mS, PAA-1A-pS, PAA-1A-pS, PAA-1A-CA, PAA-1A-NS, PAAN-1A-mS, PAAN-1A-pS, PAAN-1A-pS, PAAN-1A-CA, PAAN-1A-NS, with varying degrees of azo functionalization. The structures for the PAA polymers are shown in FIG. 1C, and the structures for the PAAN polymers are shown in FIG. 1D. In FIGS. 1B–1D, the names of the polymers correspond to the specific functional group represented by "A". In FIGS. 1A–1B, "n" is an integer in the range of about 10 to about 20,000. In FIGS. 1C–1D, "m" and "n" are integers in the range of about 10 to about 10,000, and have a ratio of about 0.1 to about 0.9.

Nonlinear Optical Chromophoric Side Chains

Figure 2:
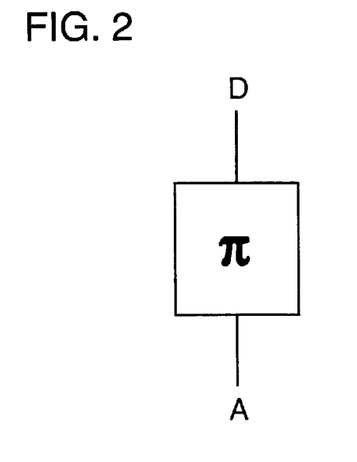
FIG. 2 is schematic representation of a non-linear optical chromophore.

To produce the ordered nonlinear optical structures, at least one of the polyelectrolytes must contain a non-linear optical (NLO) chromophoric side-chain. An NLO chromophoric side chain includes functional groups or molecules that possess donor-acceptor groups, which give rise to macroscopic second order non-linear optical properties. Organic molecules that possess donor-acceptor groups attached to an aromatic ring, which improve charge transfer through π-electron delocalization, are particularly useful as NLO chromophoric side chains. Organic molecules having these properties are shown schematically in FIG. 2. An example of such a molecule is p-nitroaniline, in which the donor group (D) is an amine group (—$NH_2$) and the acceptor group (A) is a nitro group (—$NO_2$).

"Donor" and "acceptor" groups refer to functional groups which either "donate" or "accept" π-electrons, respectively. Examples of donor groups include nitrogen in the form of amine groups (—$NH_2$), N,N-dimethylamine groups (—N($CH_3$)$_2$), or N,N-diethylamine groups (—N($C_2H_5$)$_2$), as well as methoxy groups (—$OCH_3$) and ethoxy groups (—$OCH_2CH_3$). Examples of acceptor groups include nitro groups (—$NO_2$) cyano groups (—CN), carboxylic acid groups (—COOH), sulfonic acid groups (—$SO_3H$), pyridinium salts, and N-oxide.

Figure 3:
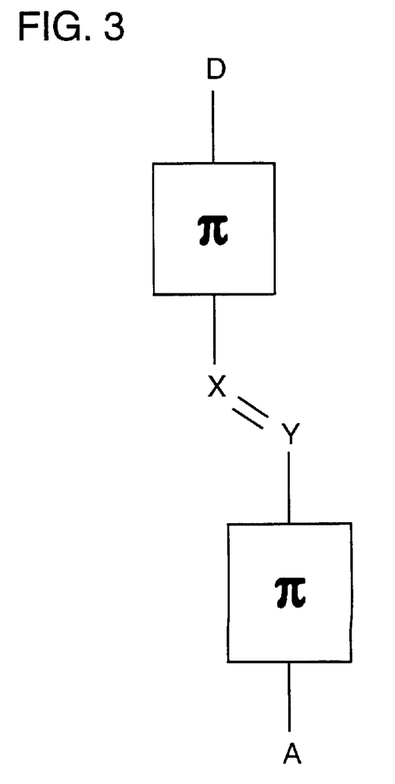
FIG. 3 is a schematic representation of a conjugated pi-extended NLO molecule.

The π moiety can be any system rich in π electrons, such as a benzene ring. A benzene ring having substituents, such as hydroxy groups, which do not interfere with or which enhance the donor and acceptor characteristics of the ring system can also be used. Efficient second order properties are further obtained using NLO molecules having an extended conjugated π-electron system with an asymmetric charge distribution provided by donor-acceptor groups at either end of the conjugated system. A conjugated π-extended NLO molecule is shown schematically in FIG. 3, wherein X and Y represent the atoms linked through extended conjugated π-electron systems to the donor (D) and acceptor (A) groups, respectively. For example, azo (i.e., represented when X and Y in FIG. 3 are both N), stilbene (i.e., X and Y in FIG. 3 are both CH), and azomethine (i.e., in FIG. 3, X is N and Y is CH, or X is CH and Y is N) are useful conjugated NLO molecules.

The azo side chains in the epoxy-based polymers and poly(acrylic acid) copolymers shown in FIGS. 1B–1D are further examples of extended NLO chromophoric side-chains. Each of these epoxy-based polymers and poly(acrylic acid) copolymers shown can be used as the polyelectrolyte having the NLO chromophoric side chain.

By attaching stronger electron-donating and electron-withdrawing groups and/or increasing the length of the π-electron system, the absorption band of the corresponding charge-transfer excitations is shifted towards longer wavelengths. There may be an associated increase the nonlinear optical coefficients. Thus, the second order nonlinear response and placement of the transparent window for optical applications can be tailored by rearranging the groups in the aromatic rings of the NLO molecules. NLO molecules selected with appropriate linear and nonlinear optical properties can be incorporated into a stable noncentrosymmetric organization.

Nonlinear Properties of the Ordered Multilayer Structure

Figure 4:
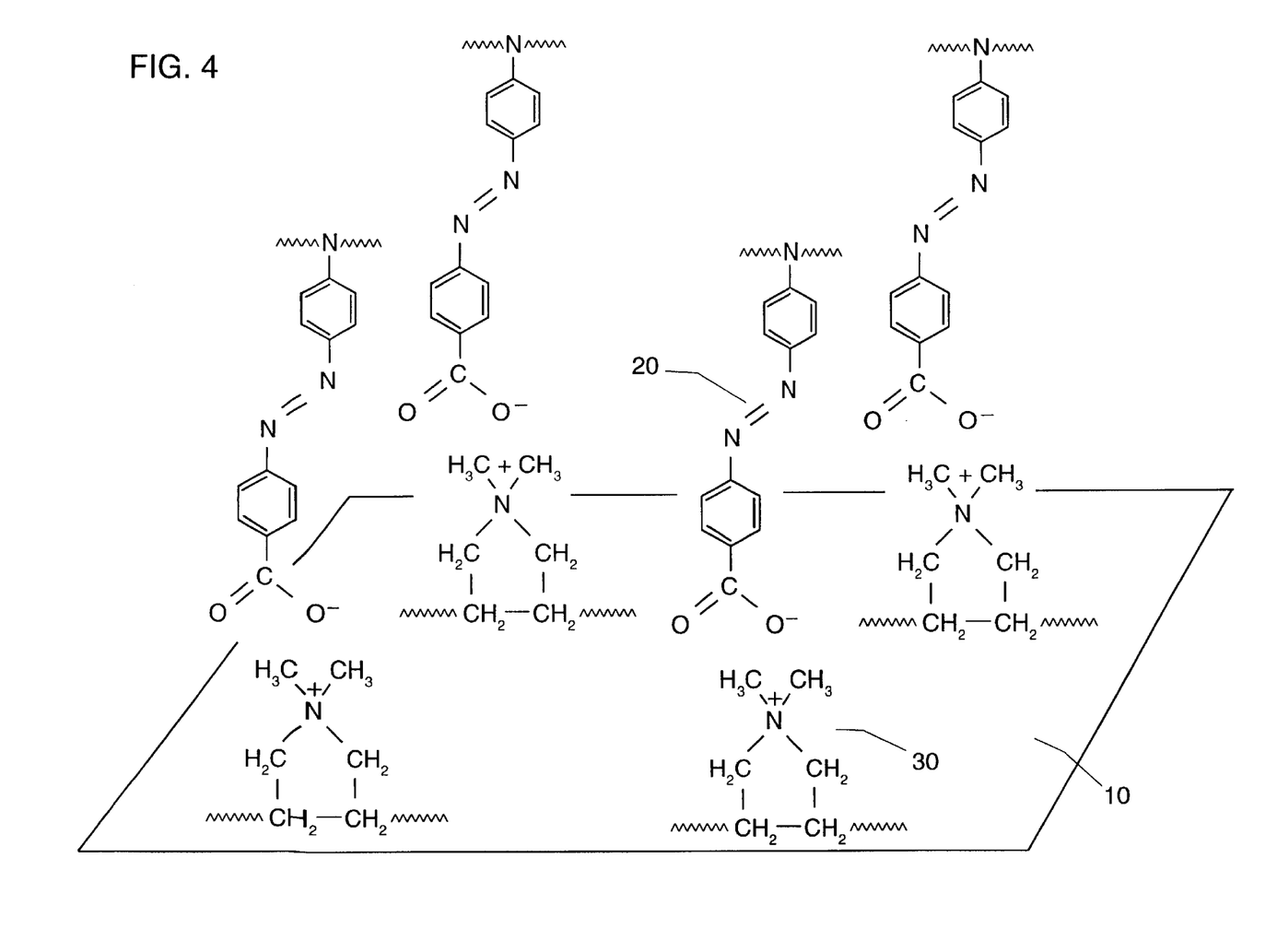
FIG. 4 is a diagram of ordered NLO chromophoric side chains on a substrate.

When the multilayer deposition is performed with an electrolyte having an NLO chromophoric side chain, these side chains will align with one another to form the ordered structure. This is illustrated in FIG. 4, for the layer-by-layer deposition of CH-1A-CA, 20, as the polyanion and poly(diallyldimethylammonium chloride) (PDAC), 30, as the polycation. NLO chromphoric azo side chains on CH-1A-CA are oriented predominantly perpendicular to the surface of the substrate 10.

The ordering of the NLO chromophoric side chains will produce a macroscopic even order non-linear optical response. For example, the multi-layer film produced by the invention can be used for second harmonic generation (SHG), in which a beam at frequency ω (e.g., a red/near-infrared beam at 800 nm) incident on the film will radiate a second beam at frequency 2ω (e.g., a blue/near-ultraviolet beam at 400 nm). The conversion efficiency of the SHG is proportional to the film NLO coefficient $d_{33}$. To maximize SHG, the beam at frequency ω needs to be incident on the film at an angle that phase matches this generating beam with the radiated second harmonic beam throughout the thickness of the film. As a result, SHG produced in the films will depend on the angle of incident radiation. For more information on phase-matching and non-linear optics in general, see, for example, N. Bloembergen, *Nonlinear Optics* (W. A. Benjamin, Menlo Park, Calif., 1965) and Y. R. Shen, *Rev. Mod. Phys.*, 48:1–32 (1976).

In contrast to the ordered arrangement shown in FIG. 4, randomly oriented NLO chromophoric side chains in a multilayer film will not produce a SHG response since the response produced by each individual NLO chromophoric side chain will interfere with one another and average to zero.

The nonlinear optical structures produced by the invention typically have $d_{33}$ values greater than 0.1 pm/V, and more typically they have $d_{33}$ values greater than 1.0 pm/V. Furthermore, the nonlinear optical structures produced by the invention can have $d_{33}$ values greater than 10 pm/V.

Theoretical Considerations

Though not meant to limit the invention in any way, the following theoretical considerations may suggest preferred embodiments of the invention.

The self-ordering of the NLO chromophoric side chains is characteristic of mesogenic phases in liquid crystals. NLO chromophoric side chains that have properties in common with rod-like mesogens may enhance the ordering described in this invention. Rod-like mesogens are rigid rod-like molecules or semi-rigid rod-like molecules that undergo limited conformational isomerization. For example, the rod-like molecule can be based on the interconnection of two rigid cyclic or aromatic units, wherein the interconnecting group causes the compound to have a substantially planar conformation. Typically, the interconnecting group contains multiple bonds such as —CH=N—, —N=N—, —(CH=CH)$_2$—, and —CH=N—N=CH—, which restrict the freedom of rotation. For more information on rod-like mesogens, see V. Percec and C. Pugh, in *Side Chain Liquid Crystal Polymers* (ed. C. B. McArdle, Blackie and Sons Ltd., Glascow, 1989).

Another consideration is the charge density on the ionized polyion. It is possible that if the repeat unit of the polyion carrying charge is too small, electrostatic repulsion between charged groups on adjacent repeat units can prevent ordering of the side chains. This suggests that it may be preferred to use ionizable side chains that are well-separated from one another with respect to the polymer backbone. This effect, if present, may be partially offset by the use of a mostly hydrophobic backbone.

EXAMPLES OF ORDERED NONLINEAR OPTICAL STRUCTURES

Example 1—PDAC/CH-1A-CA

In the first example, the ordered multilayer film was prepared using CH-1A-CA as the polyanion and poly (diallyldimethylammonium chloride) as the polycation. The NLO chromophoric side chain is the azo side chain in CH-1A-CA having the photoinduced electron transfer transition from the amine donor on the backbone to the carboxylic acid acceptor on the terminal end of the azo side chain.

Figure 5:
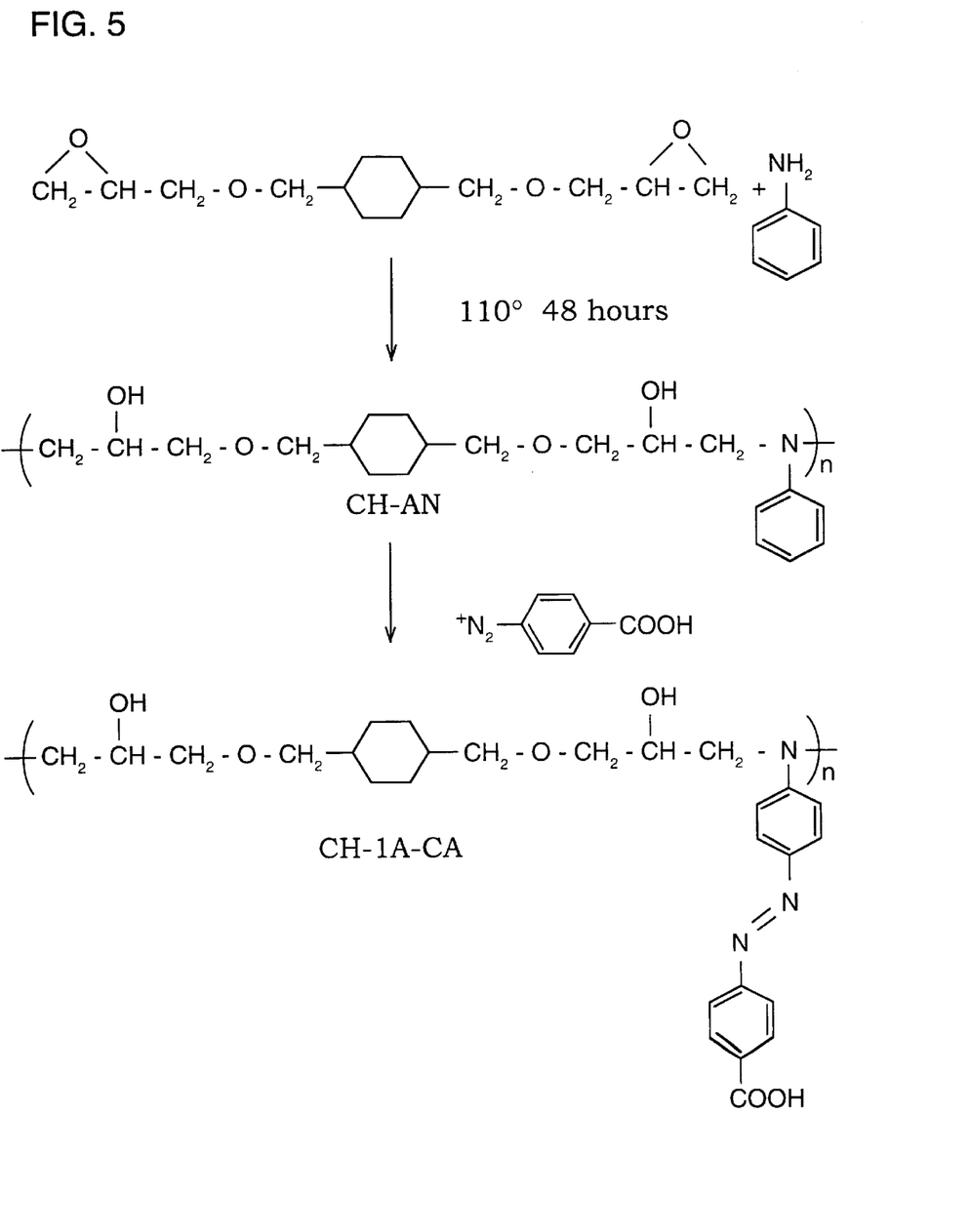
FIG. 5 is a synthetic procedure for making the epoxy-based polymer CH-1A-CA used in Example 1.

CH-1A-CA was synthesized by the post azo coupling reaction shown schematically in FIG. 5. First, the precursor polymer (CH-AN) was synthesized by gradually heating a homogeneous mixture of equimolar quantities of 1,4-cyclohexanedimethanol diglycidyl ether (5.127 g, 20 mmole) and aniline (1.863 g, 20 mmole) at 110° C. for 48 hours. As the mixture was heated, the IR absorption bands due to epoxide rings (915 cm$^{-1}$, 3058 cm$^{-1}$) nearly disappeared. The polymer was purified and low molecular weight oligomers were removed by dissolving the product in acetone (7 g in 20 ml) and precipitating with excess methanol. The polymer CH-AN was collected, washed with methanol and dried under vacuum for 24 hours. Due to the relatively low polymerization temperature, no cross-linking was observed.

The number average molecular weight was determined by gel permeation chromatography (GPC) to be 3500 with a polydispersity index of 1.57. The CH-AN polymer is soluble in common organic solvents such as dimethylformamide (DMF) and tetrahydrofuran (THF).

Thereafter, the diazonium salt of 4-aminobenzoic acid was prepared by adding an aqueous solution of sodium nitrite (0.0800 g, 1.156 mmole in 0.5 ml H$_2$O) dropwise to a dispersed mixture of 4-aminobenzoic acid (0.1371 g, 1 mmole) in a solution of sulfuric acid (0.12 ml) and glacial acetic acid (2 ml) at 0° C. After a clear solution of the diazonium salt was formed, the excess nitrous acid was decomposed by addition of sulfamic acid (0.1 g in 1 ml H$_2$O). The solution of diazonium salt was added dropwise into a dimethylformamide solution containing CH-AN (0.2051 g, 0.8 mmole) at 0° C. After the solution was stirred at 0° C. for 12 hours, the mixture was poured into water under agitation while adding a few drops of hydrochloric acid. The precipitated CH-1A-CA was collected by filtration and washed with water until the wash solution was neutral. The CH-1A-CA was further purified by extracting repeatedly with chloroform. The solid was dried under vacuum for 24 hours.

The purity of the CH-1A-CA was monitored and confirmed by different spectroscopic methods. Using $^1$H NMR, the degree of azo functionalization was determined to be almost 100%. By comparison with CH-AN, the average molecular weight of CH-1A-CA was estimated to be about 5000. The Tg of CH-1A-CA was measured to be 93° C. as compared with 41° C. for CH-AN. The observed significant increase in Tg is a consequence of increased polarity and size of the azo chromophores.

Hydrophilic glass substrates were prepared by sonicating glass slides in concentrated H$_2$SO$_4$/30% H$_2$O$_2$ solution for 1 hour followed by washing thoroughly in Milli-Q water several times. The slides were subsequently sonicated in H$_2$O/H$_2$O$_2$/NH$_4$OH (5:1:1) solution for 1 hour followed by several rinses with Milli-Q water and dried. Commercially available medium molecular weight poly(diallyldimethylammonium chloride) 20% solution was purchased from Aldrich (Milwaukee, Wis.) and used as the polycation.

Multilayer films were prepared by alternate dipping of the substrates in aqueous solutions of poly(diallyldimethylammonium chloride) (0.5 mmole/l, pH=8) and CH-1A-CA (0.5 mmole/l, pH=8). The substrates were dipped for 10 minutes in the polyelectrolyte solutions. Each polyion layer deposition was followed by washing with excess Milli-Q water of the same pH. In this example, the substrates were initially dipped in the poly(diallyldimethylammonium chloride) solution. The procedure produced a multilayer structures on both sides of the glass substrate, i.e., a double-sided multilayer film was produced.

Figure 6:
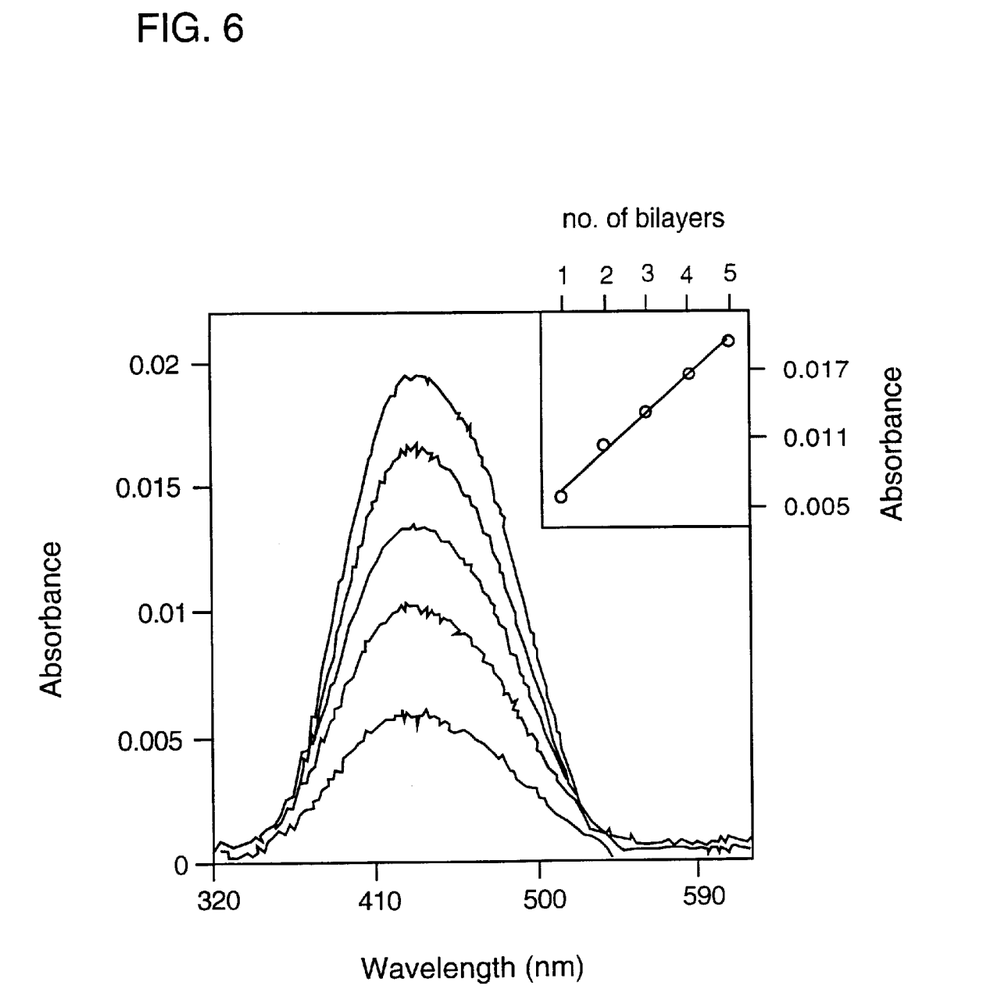
FIG. 6 is a graph of UV-vis spectra of the multilayer structures.

The UV-vis spectra of the multilayer films was measured after each bilayer deposition for five bilayer depositions, as shown in FIG. 6. The spectrum with the smallest absorbance peak corresponds to a single bilayer deposition, and the subsequent spectra correspond to additional bilayer depositions. The inset plots the peak absorbance for each spectrum. A linear increase in absorption was observed as the number of bilayers increases. The thickness of a 5 bilayer film was measured to be 72 Å using ellipsometry.

The second-order NLO coefficients ($d_{33}$) of the self-assembled films were measured by second harmonic generation at 1.064 μm with a Q-switched Nd:YAG laser (Quantel 660A). The polarized SHG signal, selected with an interference filter at 0.532 μm, was detected by a photomultiplier. By comparing the SHG intensity from the multilayers with that from the quartz crystal, the $d_{33}$ coefficient of a 5 bilayer sample was determined to be 19 pm/V.

Figure 7:
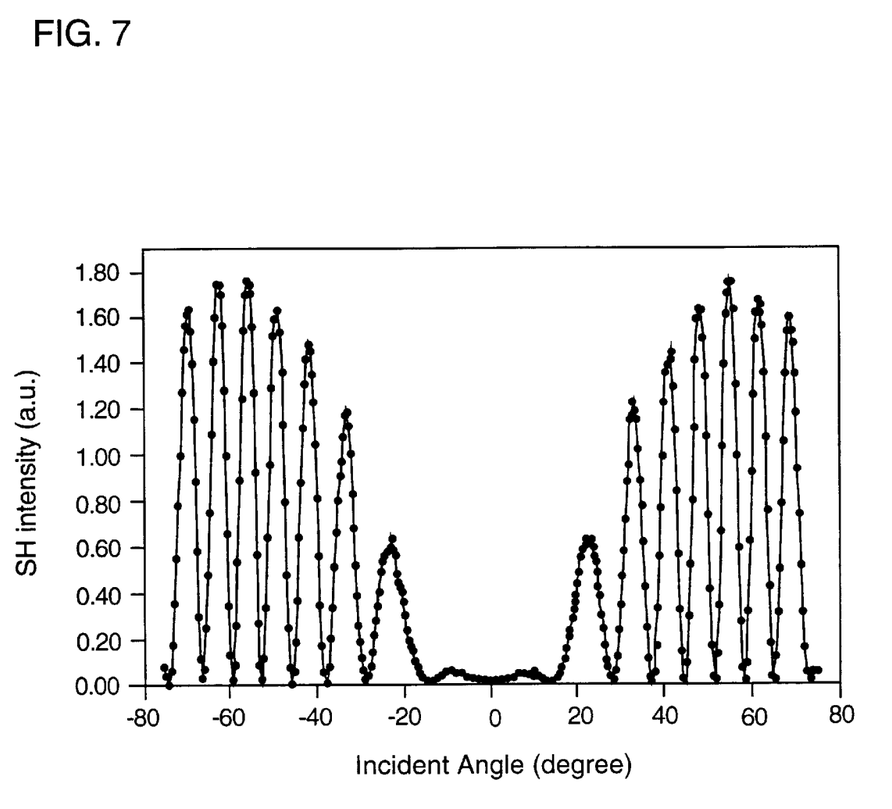
FIG. 7 is a graph of second harmonic generation (SHG) from Example 1.

The intensity of the SHG signal as a function of the incident angle is shown in FIG. 7. The SHG signal exhibits the dependence on incident angle expected in view of phase-matching considerations. In particular, a complete extinction of SHG signal was observed for normal incidence. The high-frequency dependence of the SHG signal on incident angle is due to the interference between SHG produced by opposite sides of the double-sided film. This higher frequency dependence was not observed from similarly produced single-sided multilayer films.

Example 2—CH-1A-CA/PDAC

As in Example 1, multilayer NLO films were produced using CH-1A-CA as the polyanion and PDAC as the polycation. The procedure was identical to Example 1, except that the hydrophilic substrate was initially dipped in the CH-1A-CA polyanion solution rather than the PDAC polycation solution. The SHG properties of the resulting multilayer films were substantially identical to the properties of the multilayer films in Example 1.

Example 3—CH-1A-Py/SPS

Ordered multilayer NLO films were prepared using the same procedure described in Example 1, except that CH-1A-Py was used as the polycation and sulfonated polystyrene (SPS) was used as the polyanion. CH-1A-Py was synthesized by a post azo coupling reaction with the precursor polymer CH-AN. The synthesis of the polymers were identical to the procedure described in Example 1, with the following exception. To prepare CH-1A-Py, the diazonium salt of 4-aminopyridine was used rather than the diazonium salt of 4-aminobenzoic acid. Again a 5-bilayer double-sided film was produced.

Figure 8:
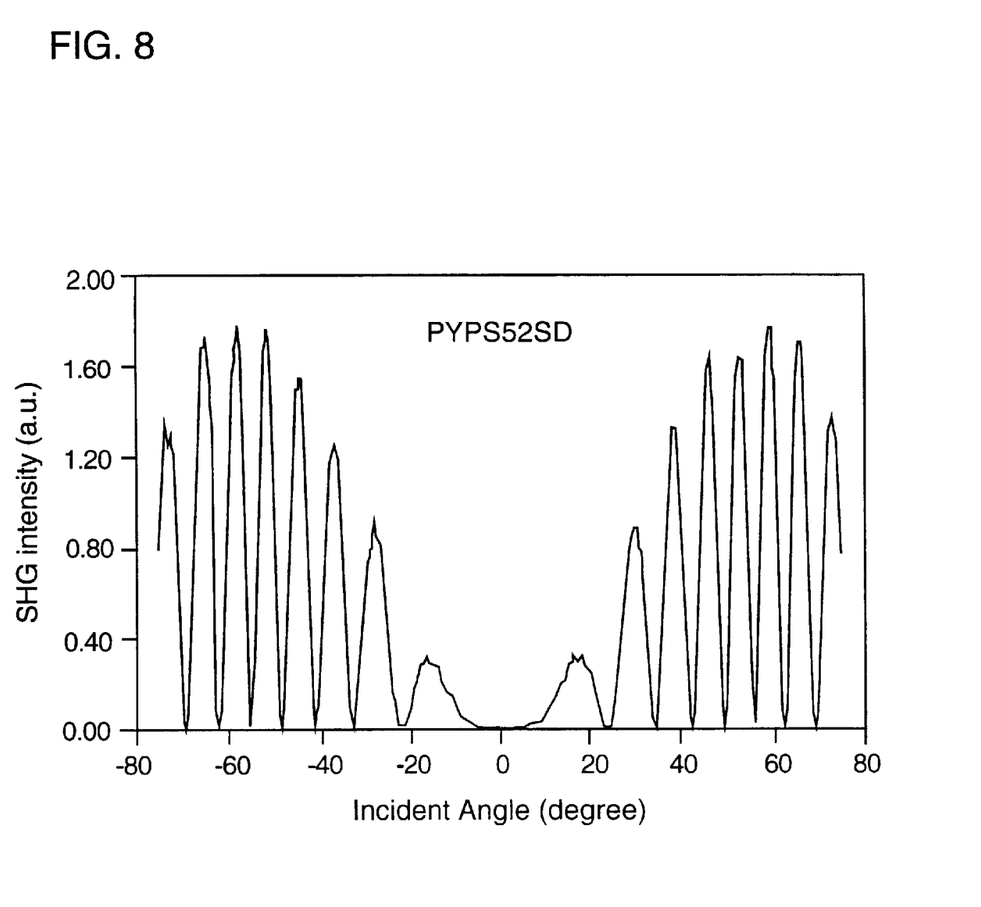
FIG. 8 is a graph of SHG from Example 3.

SHG signal produced by the film was measured as a function of incident angle, as shown in FIG. 8. Again, the film exhibited the characteristic dependence on incident angle expected from the ordered structure of NLO chromophoric side chains, as described in Example 1. The value of $d_{33}$ in this case was determined to be 6 pm/V.

Example 4—PDAC/CH-1A-NS

Ordered multilayer NLO films were prepared using the same procedure described in Example 1, except that CH-1A-

NS was used as the polyanion. This polymers was synthesized by a post azo coupling reaction with the precursor polymer CH-AN. The synthesis of the polymer was identical to the procedure described in Example 1, with the exception that the diazonium salt of 2-amino-5-nitrobenzenesulfonic acid was used rather than the diazonium salt of 4-aminobenzoic acid. Once again a 5 bilayer double-sided film was produced. In this case, one side was scraped off so that SHG signal from a single-sided film could be measured.

Figure 9:
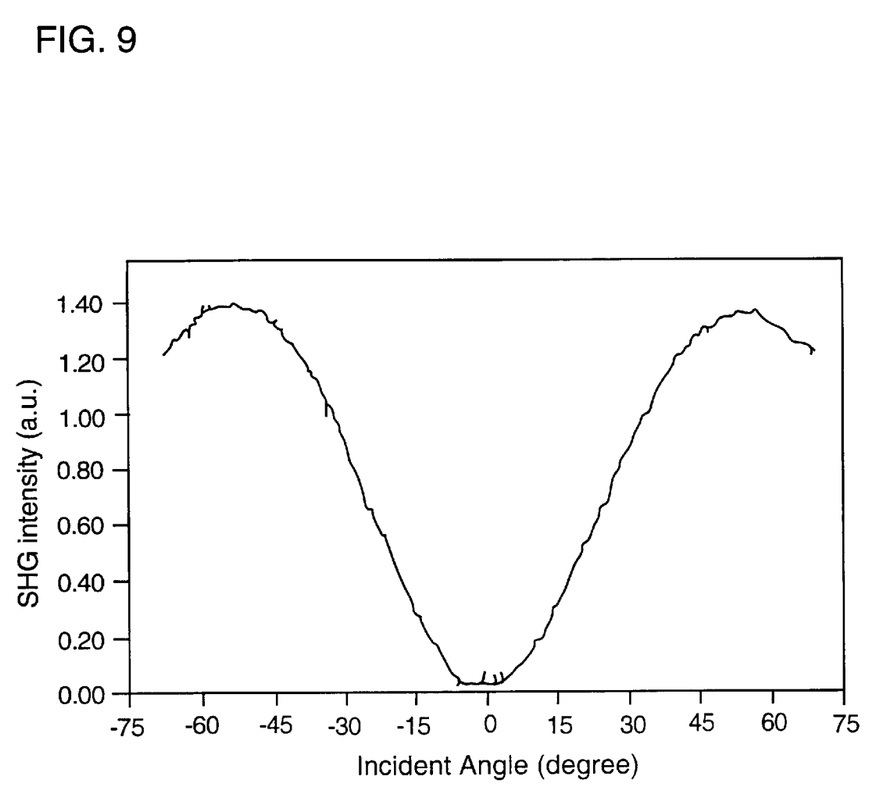
FIG. 9 is a graph of SHG from Example 4.

The SHG signal produced by the single-sided film was measured as a function of incident angle, as shown in FIG. 9. Again, the film exhibited the characteristic dependence on incident angle expected from the ordered structure of NLO chromophoric side chains. Also, as expected, the high-frequency dependence on incident angle observed for the double-sided films in Examples 1–3 disappeared. The value measured for $d_{33}$ was determined to be 20 pm/V.

Example 5—PDAC/PAA-1A-NS

Figure 10:
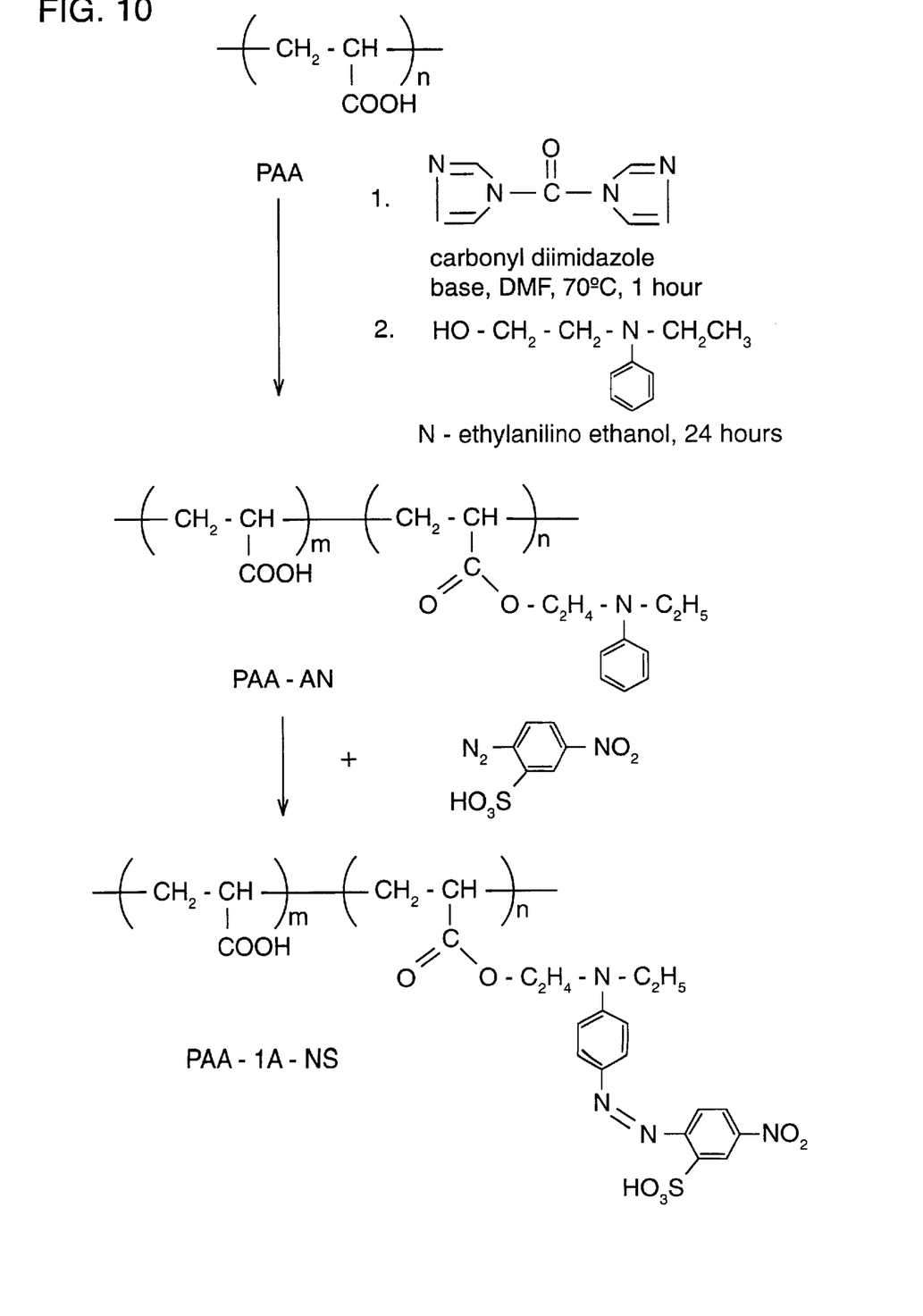
FIG. 10 is a schematic representation of a synthetic procedure for making the poly(acrylic acid) copolymer PAA-1A-NS used in Example 5.

Ordered NLO multilayer films can also be produced by using the poly(acrylic acid) copolymer PAA-1A-NS as the anionic polyelectrolyte and poly(diallyldimethylammonium chloride) as the cationic polyelectrolyte. To synthesize the copolymer, the procedure shown in FIG. 10 is followed. First, poly(acrylic acid) (PAA) is reacted with carbonyl diimidazole at 70° C. in a slightly basic dimethylformamide (DMF) solution for about 1 hour. Thereafter, N-ethylanilino ethanol (having a mol % concentration about equal to the carbonyl diimidazole) is added to the solution and left for about 24 hours to produce the copolymer PAA-AN. The ratio of the monomeric groups in the copolymer is determined by the relative concentration of the PAA to the alcohol. For example, for a 1:1 ratio, the relative concentration of the PAA to the alcohol should be 2:1 (by mol %), i.e., substitution occurs on half of the PAA monomers.

To add the NLO side chain, a post azo coupling reaction is used. In particular, the copolymer is reacted with the diazonium salt of 2-amino-5-nitrobenzenesulfonic acid to produce the anionic polyelectrolyte PAA-1A-NS. Other than using this anionic polyelectrolyte, the procedure is identical to the procedure in Example 1.

In FIG. 10, the "m" and "n" are integers in the range of about 10 to about 10,000, and have a ratio of about 0.1 to about 0.9.

Each of the poly(acrylic acid) copolymers shown in FIG. 1C can also be used as a polyelectrolyte and are synthesized in the same manner as above, except that the appropriate diazonium salt (e.g., the diazonium salt of 4-aminobenzoic acid for PAA-1A-CA) is used in place of the diazonium salt of 2-amino-5-nitrobenzenesulfonic acid.

Other Embodiments

It is to be understood that while the invention has been described in conjunction with the detailed description thereof, that the foregoing description is intended to illustrate and not limit the scope of the invention, which is defined by the scope of the appended claims.

For example, a charged substrate can be used in place of a hydrophilized substrate to provide adsorption sites for the polyions. The charged substrate can be prepared using a number of techniques. For example, charges can be sprayed onto the substrate, as in corona poling techniques. Also, the substrates can be chemically treated to provide a protonated surface. Of course, when a charged surface is used, the first polyelectrolyte solution used in the multilayer deposition technique must have polyions that are oppositely charged with respect to the charges on the substrate.

In addition, the prepared substrates can be contacted with polyelectrolyte solutions in various ways in addition to dipping. For example, the polyelectrolyte solutions can be sprayed, painted, or poured onto the substrates, or, under proper conditions of temperature and pressure, polyelectrolyte gases can be used to contact the substrate.

Other aspects, advantages, and modifications are within the scope of the following claims.

What is claimed is:

1. A method of making a multilayer structure having macroscopic second order nonlinear optical properties, the method comprising the steps of:

contacting a substrate having ionic adsorption sites with a first charged polyion to form a first layer of the multilayer structure;

ceasing contact of the substrate with the first charged polyion; and thereafter, contacting the substrate with a second charged polyion having a charge opposite to that of the first charged polyion to form a second layer of the multilayer substrate, wherein at least one of the polyions comprises nonlinear optical chromophoric side chains that are rod-like mesogens, and wherein the second contacting step causes the side chains to self-align into an ordered arrangement and exhibit macroscopic even-order nonlinear optical properties corresponding to a d33 value of greater than 0.1 pm/V, and wherein at least one of the polyions is formed from a polymer synthesized from an addition reaction of aniline and a compound having two epoxide rings.

2. The method of claim 1, wherein the side chains comprise an azo group.

3. The method of claim 1, wherein the at least one of the polyions is ionized CH-1A-NS.

4. The method of claim 1, wherein the at least one of the polyions is ionized CH-1A-CA.

5. The method of claim 1 wherein the substrate is hydrophilic.

6. The method of claim 1 wherein the substrate is charged.

7. A multilayer structure produced by the method of claim 1.

8. The method of claim 1, further comprising repeating the first contacting, ceasing, and second contacting steps to produce a plurality of oppositely charged bilayers in the multilayer structure.

9. The method of claim 1, wherein the side chains comprise an extended conjugated pi-electron system.

10. A multilayer structure comprising:

a first layer comprising a plurality of polymers having nonlinear optical chromophoric side chains that are rod-like mesogens; and a second layer comprising a plurality of polymers different from the plurality of polymers in the first layer, wherein the side chains are oriented to exhibit macroscopic even-order nonlinear optical properties corresponding to a d33 value of greater than 0.1 pm/V, and wherein the polymers in the first layer are formed from a polymer synthesized from an addition reaction of aniline and a compound having two epoxide rings.

11. The structure of claim 10, wherein the structure has a $d_{33}$ value of greater than 1.0 pm/V.

12. The structure of claim 10, further comprising a substrate, wherein one of the first layer and second layer is adsorbed onto the substrate.

13. The structure of claim 10, wherein the side chains comprise an azo group.

14. The structure of claim 10, wherein the polymers in the first layer are CH-1A-NS.

15. The structure of claim 10, wherein the polymers in the first layer are CH-1A-CA.

16. The multilayer structure of claim 10 further comprising:
   a third layer comprising a plurality of polymers that are the same as those of the first layer; and
   a fourth layer comprising a plurality of polymers that are the same as those of the second layer, wherein the third layer is between the second and fourth layers.

17. The structure of claim 16, wherein the structure has a $d_{33}$ value of greater than 1.0 pm/V.

18. The structure of claim 16, wherein the structure has a $d_{33}$ value of greater than 10 pm/V.

19. The structure of claim 10, wherein the structure has a $d_{33}$ value of greater than 10 pm/V.

20. The structure of claim 10, wherein the side chains comprise an extended conjugated pi-electron system.

21. The structure of claim 10, further comprising additional layers.

22. A method of making a multilayer structure having macroscopic second order nonlinear optical properties, the method comprising the steps of:
   contacting a substrate having ionic adsorption sites with a first charged polyion to form a first layer of the multilayer structure;
   ceasing contact of the substrate with the first charged polyion; and thereafter,
   contacting the substrate with a second charged polyion having a charge opposite to that of the first charged polyion to form a second layer of the multilayer substrate, wherein at least one of the polyions comprises nonlinear optical chromophoric side chains that are rod-like mesogens, and wherein the second contacting step causes the side chains to self-align into an ordered arrangement and exhibit macroscopic even-order nonlinear optical properties corresponding to a d33 value of greater than 0.1 pm/V, and wherein at least one of the polyions is formed from a poly(acrylic acid) copolymer.

23. A multilayer structure comprising:
   a first layer comprising a plurality of polymers having nonlinear optical chromophoric side chains that are rod-like mesogens; and
   a second layer comprising a plurality of polymers different from the plurality of polymers in the first layer,
   wherein the side chains are oriented to exhibit macroscopic even-order nonlinear optical properties corresponding to a d33 value of greater than 0.1 pm/V, and
   wherein the polymers in the first layer are formed from a poly(acrylic acid) copolymer.

* * * * *